United States Patent
Levy et al.

(10) Patent No.: US 6,204,623 B1
(45) Date of Patent: *Mar. 20, 2001

(54) HEATER, HUMIDIFIER OR FAN INCLUDING A CIRCUIT FOR CONTROLLING THE OUTPUT THEREOF

(75) Inventors: William Levy, Hopedale, MA (US); Robert A. Sherwood; John C. Polonchak, both of El Paso, TX (US)

(73) Assignee: The Holmes Group, Inc., Milford, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,689

(22) Filed: Dec. 17, 1998

(51) Int. Cl.$^7$ .................................................. G05D 23/00
(52) U.S. Cl. ........................................... 318/641; 392/498
(58) Field of Search .................... 318/471–473, 318/483, 641; 392/313, 498

(56) References Cited

U.S. PATENT DOCUMENTS

| | | | |
|---|---|---|---|
| 4,527,247 | * 7/1985 | Kaiser et al. | 364/550 |
| 5,072,597 | * 12/1991 | Bromley et al. | 62/209 |
| 5,278,936 | 1/1994 | Shao . | |
| 5,410,230 | * 4/1995 | Bessler et al. | 318/471 |
| 5,449,319 | * 9/1995 | Dushane et al. | 454/319 |
| 5,457,766 | * 10/1995 | Ko | 388/831 |
| 5,578,753 | * 11/1996 | Weiss et al. | 73/335.02 |
| 5,592,989 | * 1/1997 | Lynn et al. | 165/259 |
| 5,628,199 | * 5/1997 | Hoglund et al. | 62/155 |
| 5,836,691 | * 11/1998 | Yamauchi | 374/117 |
| 5,911,747 | * 6/1999 | Gauthier | 62/176.6 |
| 5,943,473 | * 8/1999 | Levine | 392/401 |
| 5,945,038 | * 8/1999 | Anderson | 261/26 |
| 5,975,502 | * 11/1999 | Stanek et al. | 261/23.1 |
| 5,984,002 | * 11/1999 | Kido et al. | 165/228 |
| 5,984,663 | * 11/1999 | Joyce | 431/76 |
| 5,993,312 | * 11/1999 | Panoushek et al. | 460/1 |

* cited by examiner

Primary Examiner—David Martin
Assistant Examiner—Rina I. Duda
(74) Attorney, Agent, or Firm—Hoffman & Baron, LLP; Francis E. Marino

(57) ABSTRACT

A heater, humidifier or fan has a control circuit including a microcontroller having an algorithm for controlling power to the appliance. The power to the appliance is varied in accordance with a target temperature/humidity signal and an actual temperature/humidity signal. Preferably, a sensor electrically connected to a clock oscillator input of the microcontroller is used to vary the clock oscillator frequency in response to changes in ambient temperature/humidity. The frequency of the clock oscillator varies in response to changes in temperature/humidity and the microcontroller in response to the frequency of the clock oscillator variably controls the power to the appliance.

23 Claims, 3 Drawing Sheets

HEATER, HUMIDIFIER OR FAN INCLUDING A CIRCUIT FOR CONTROLLING THE OUTPUT THEREOF

BACKGROUND OF THE INVENTION

1. Field Of The Invention

The present invention relates generally to a device controller, and more particularly relates to a control circuit for variably controlling power to an appliance such as a heater, a humidifier and/or a fan.

2. Description Of The Prior Art

It is known in the art to control the velocity of a fan or power to a heater in response to changes in temperature and/or humidity. Generally, in a temperature control circuit, a transducer senses changes in temperature and a control circuit adjusts the power to a fan or power to a heater in response to the temperature changes. a humidifier control circuit generally has a humidity sensor and a control circuit that responds to changes in humidity by controlling the flow of air over a wick filter or by controlling the temperature of an evaporative water tank. The temperature and humidity control circuits typically include a triac which is used to control the AC power to the fan or heater.

Traditional control circuits consist of numerous discrete components. The use of discrete components tends to provide temperature and/or humidity control which is less accurate and less reliable. The poor accuracy is due to changing part tolerances and due to limitations within the discrete component circuit design.

Modem control circuits often include microcomputer type devices such as a microprocessor, a microcontroller or a digital signal processor. These control circuits typically result in improved accuracy and speed, but tend to be more costly. They involve numerous support logic such as address decode devices, memory devices and analog to digital converters, which increase the cost of the control circuitry. It would therefore be advantageous to have a sophisticated means for quickly and accurately adjusting fan velocity or heater power at a cost substantially less than that of the typical modern control circuit. It would also be advantageous to have a sophisticated means for adjusting fan velocity or power to a heating element that comprises substantially fewer components than that of the typical modern control circuits.

Conventional control circuits also react to changes in temperature and/or humidity by either switching the appliance On and Off or by switching between fixed appliance speeds, such as High and Low. This results in the actual temperature and/or humidity overshooting and/or undershooting the desired level. It would therefore be advantageous to have a control circuit that could variably control power to an appliance based on continuous monitoring and evaluation of the input parameter.

Thus, the present invention is directed toward overcoming the disadvantages of conventional temperature control circuits which have been discussed above.

OBJECTS AND SUMMARY OF THE INVENTION

It is the object of the invention to provide a device which can quickly and accurately determine absolute temperature and/or humidity.

It is another object of the present invention to provide a device which can quickly and accurately adjust velocity of a fan motor and/or power to a heating element.

It is a further object of the present invention to provide an apparatus which can quickly and accurately adjust velocity of a fan motor and/or power to a heating element with minimal overshoot and/or undershoot.

It is still another object of the present invention to provide a method for monitoring and measuring analog signals for use in an appliance controller.

It is yet another object of the present invention to provide a method for variably controlling an appliance.

The apparatus formed in accordance with the present invention is capable of controlling appliances such as fans, heaters and humidifiers. A thermistor or humidistat may be used as a sensor which is responsive to changes in ambient temperature or humidity, respectively. a control circuit, including a microcontroller, responds to a signal provided by the sensor and varies the power to a fan or heater accordingly.

Preferably, the control circuit includes a clock oscillator and a variable electrical device, (i.e., a thermistor or humidistat), responsive to an external source, such as ambient temperature and/or humidity. The variable electrical device controls a frequency of the clock oscillator in response to the external source and the microcontroller calculates the ambient parameter in response to the frequency of the clock oscillator and generates a control signal in response to the clock oscillator frequency. The control signal is used to control a fan speed or power provided to a heating element of an appliance. Thus, the present invention provides an apparatus for a variable controller.

More specifically, the microcontroller includes a counter having a counter value associated therewith. The counter value is responsive to the clock oscillator for determining a frequency of the clock oscillator which is responsive to the ambient parameter. The microcontroller may also include a look-up table which allows the calculation of ambient parameters based upon the counter value. The microcontroller further includes an interrupt whereby the counter value is set to zero upon the zero crossing of the interrupt based upon the AC input. The counter value at subsequent zero crossings provides the basis for determining the clock oscillator frequency. As earlier noted, the clock oscillator frequency is used to determine an ambient parameter and for generating a control signal in response thereto. The variable electrical device may take the form of a thermistor, for use in a thermostat or a variable capacitive device or the like for use in a humidistat.

A preferred method of generating a control signal by a microcontroller formed in accordance with the present invention includes the steps of providing a variable controller having the features previously described and controlling a frequency of oscillation of the clock oscillator in response to the external source changing the variable electrical device and generating a control signal in response to a frequency of the clock oscillator. The method may also include calculating ambient temperature in the microcontroller in response to the frequency of the clock oscillator.

More specifically, the preferred method of generating a control signal, especially for use in a thermostat, includes the steps of altering a variable electrical device, such as the thermistor, in response to ambient temperature, controlling a frequency of a clock oscillator in a microcontroller in response to the value of the thermistor, calculating an ambient temperature in the microcontroller in response to the frequency of the clock oscillator, and generating a control signal which responds to the calculated ambient temperature for variably controlling an appliance such as fan motor or a power to a heater element. The microcontroller may also include a counter therein and the method having the step of setting a value in a counter of the microcontroller in response to the frequency of the clock oscillator and comparing the value in the counter to a look-up table in the microcontroller to determine ambient temperature and/or humidity.

A preferred form of the device controller, as well as other embodiments, objects, features and advantages of this invention, will be apparent from the following detailed description of illustrative embodiments, which is to be read in connection with the accompanying drawings.

DETAILED DESCRIPTION OF THE PREFERRED EMBODIMENTS

The present invention is directed to a control circuit and method for controlling appliances such as a fan, humidifier, or a heater in response to an external source. i.e., ambient temperature and/or humidity. The control circuit may be utilized in such appliances as disclosed in commonly owned U.S. Pat. Nos. 5,800,741 (wick filter humidifier), U.S. Pat. No. 5,792,390 (evaporative tank humidifier), U.S. Pat. No. 5,761,377 (radiant/forced air heater), U.S. Pat. No. 5,655,055 (space heater), U.S. Pat. No. 5,720,594 (oscillating fan) and U.S. Pat. No. 5,660,605 (window fan), the disclosures of which are incorporated herein by reference.

Figure 1:
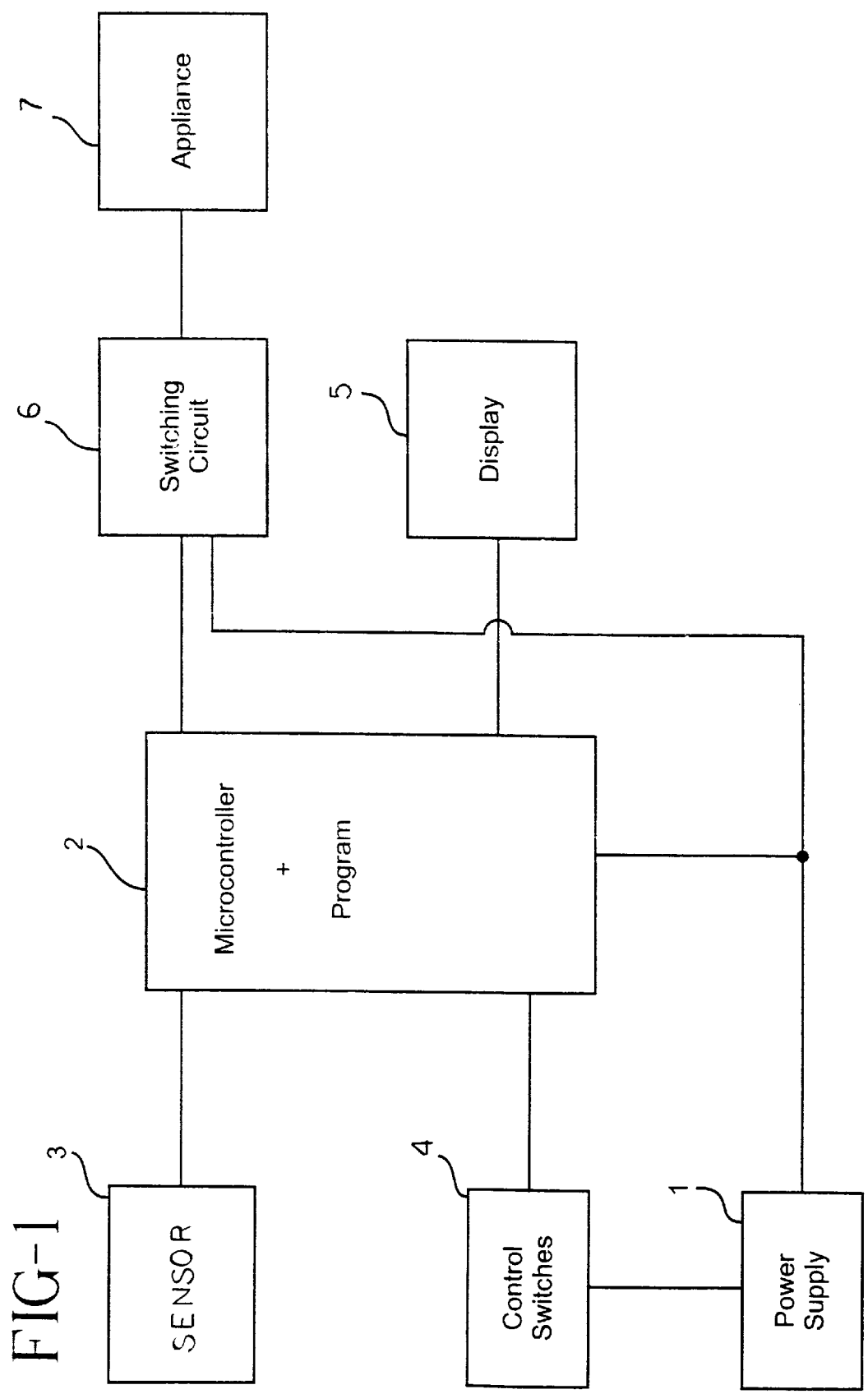
FIG. 1 is a block diagram of an electronic circuit for controlling an appliance formed in accordance with the present invention.

A block diagram of an electronic control circuit formed in accordance with the present invention is illustrated in FIG. 1. The electronic circuit includes the following: a power supply 1, a microcontroller including an algorithm 2, a sensor 3, control switches 4, a display indicator 5, and a switching circuit 6 which is electrically connected to an appliance 7.

The control circuit includes control switches 4 which are electrically coupled to the microcontroller input ports and provide a means for setting and adjusting the appliance control target temperature and/or humidity. a sensor 3 is also provided which senses ambient temperature/humidity changes and provides this information to the microcontroller 2. The microcontroller 2 includes an algorithm which analyzes the ambient temperature/humidity information provided by the sensor 3 and compares this information with the desired set point. The microcontroller 2 generates control signals in response to the input set point and measured ambient temperature/humidity for adjusting output of the appliance, e.g., motor speed of a fan or power to a heater element, to achieve and maintain the desired target temperature/humidity setting. The microcontroller 2 also controls a digital display 5 which is used to display either or both the actual sensed ambient temperature/humidity and the desired target temperature/humidity.

In operation, when the appliance is plugged in, the display 5 begins to flash and indicates a mode of operation and the present temperature/humidity reading provided by the sensor 3. One of the control switches 4 may be in the form of a "Power/Mode" switch which allows the user to select a desired mode of operation, e.g. "Off/High/Low/Auto". When the user selects the "High" mode, continuous maximum power is supplied to the fan or heater. In the "Low" mode a reduced level of power, for example, approximately one half of maximum is continuously supplied to the fan or heater. In both the "High" and "Low" manual operation modes, the microcontroller's algorithm is inactive and the appliance operates in a manual mode regardless of the target set temperature or humidity.

However, when the "Auto" mode is activated, the microcontroller 2 operates to control the appliance output based upon the sensed ambient temperature and/or humidity. In operation, the microcontroller analyzes information received from the sensor 3 and compares this information with a desired set point input through one or more "Set Point Adjust" control switches. The "Set Point Adjust" may be a single control switch which, when pressed, increases the set point by one or more increments until a maximum setting is reached at which point pressing the switch further returns the set point to its lowest setting. Alternatively, the "Set Point Adjust" may comprise two control switches which allow for up and down adjustment. The microcontroller's program reads the desired temperature/humidity level set by the control switches and compares this set point with the information received by the sensor 3. When the difference between the set point and the actual ambient temperature/humidity, as determined by the sensor, is for example greater than about 10 units, the program of the microcontroller sends a signal to the switching circuit 6 to provide maximum power to the appliance. When the difference between the set point and the actual reading from the sensor is for example less than about ten units, the microcontroller's program sends a signal to the switching circuit 6 to provide a reduced level of power, for example, approximately one-half maximum, to the appliance. Finally, when the difference between the set point and the actual reading is 1 unit or less, the program sends a signal to the switching circuit to terminate power to the appliance. Thus, quick and accurate temperature/humidity control without overshoot or undershoot is achieved.

Figure 2:
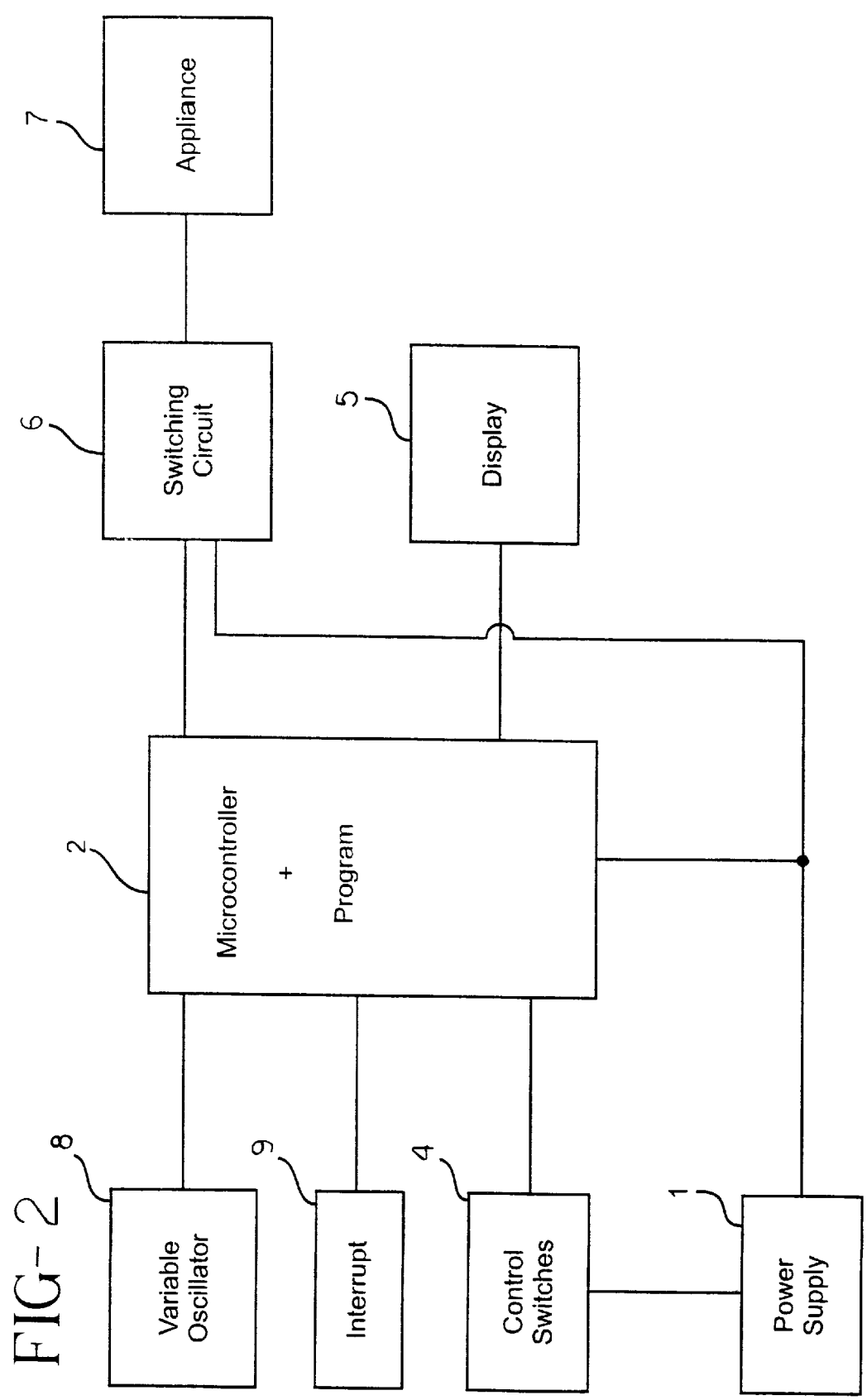
FIG. 2 is a block diagram of an electronic circuit including a variable oscillator for controlling an appliance formed in accordance with the present invention.

For improved accuracy and responsiveness, the control circuit preferably further includes a variable oscillator 8 which incorporates the sensor 3 and an interrupt circuit 9 as shown in FIG. 2. In operation, in order to determine the ambient air temperature/humidity, the variable oscillator 8 changes frequency in response to sensed ambient temperature/humidity changes and transfers this information to the microcontroller 2. The microcontroller 2 preferably includes an algorithm which analyzes frequency changes of the variable oscillator and provides control signals for adjusting motor speed of a fan or power to a heater element to achieve and maintain the desired target temperature/humidity setting. An interrupt 9 is electrically coupled to the AC power line and generates an interrupt signal at each zero crossing of the 60 Hz cycle. Thus, at every half cycle, a microcontroller counter is read and then set to zero and the microcontroller compares the value in the counter to a look-up table in the algorithm stored therein which includes related temperatures/humidity. The AC power line also provides a reference frequency for the microprocessor clock oscillator.

Figure 3:
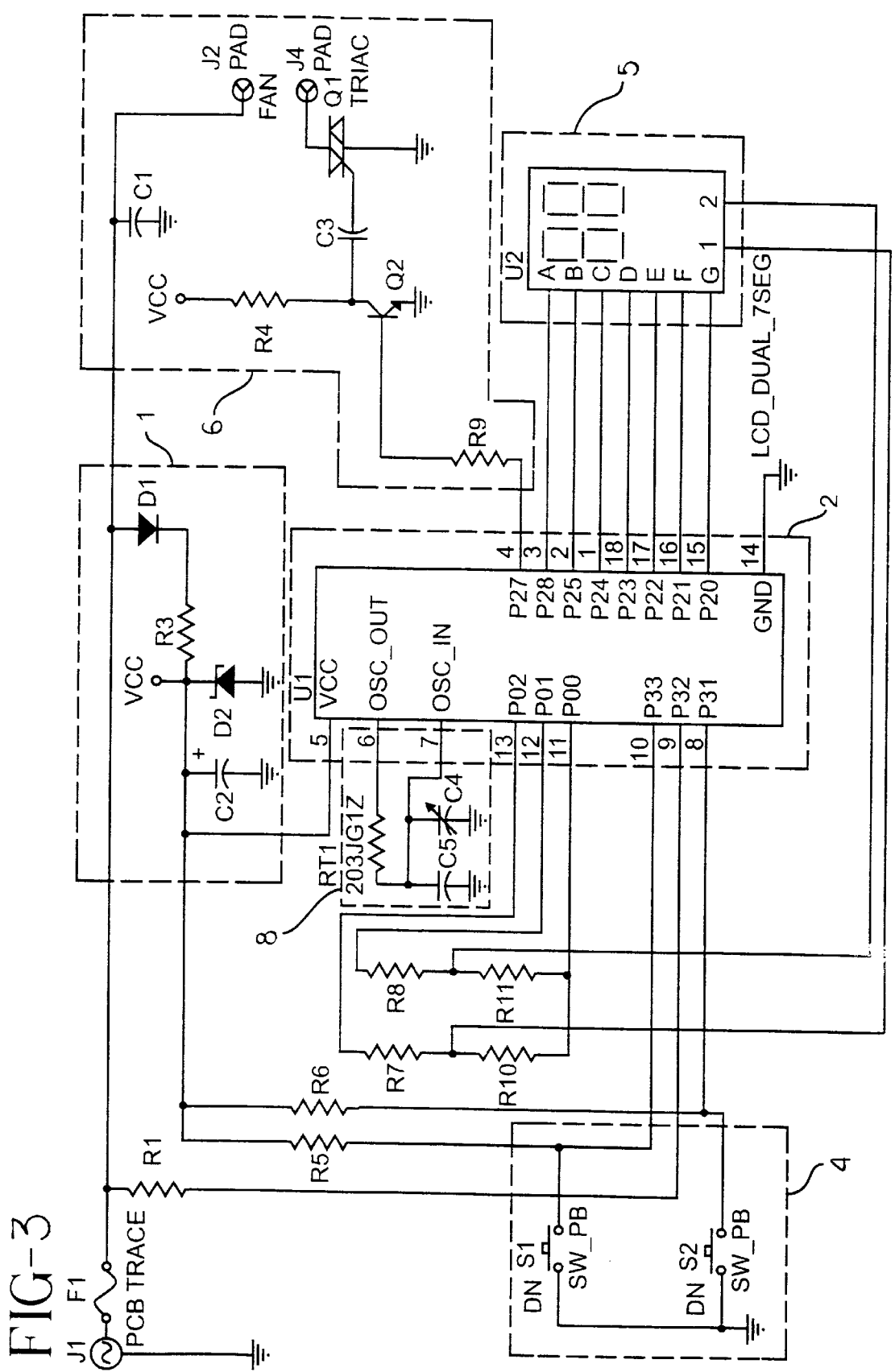
FIG. 3 is a schematic diagram of a control circuit including a variable oscillator for controlling an appliance formed in accordance with the present invention.

Referring now to FIG. 3, a schematic diagram of the control circuit of FIG. 2 formed in accordance with the preferred embodiment of the present invention is illustrated. The power supply circuit 1 includes a half-wave rectifier including diode D1 and resistor R3. Diode D1 and resistor R3 are coupled to a 120 volts AC power source and convert the AC power source to a DC pulse. The power supply 1 provides approximately 5 volts DC to the control circuitry of FIG. 3. a zener diode D2 is coupled to resistor R3 and provides a 5 volt regulated DC supply to the control circuit. Filter capacitor C2 is coupled to the zener diode D2 to filter ripple from the DC supply to acceptable limits. The DC supply provides power to the microcontroller U1, transistor Q2, switch S1 and switch S2.

The control switch circuit 4 formed in accordance with the preferred embodiment of the present invention includes UP and DN push-buttons, S1 and S2, to set and change the target temperature/humidity. (The "Power/Mode" switch is not shown in FIG. 3.) The switches S1, S2 are preferably single-pole, single-throw momentary push-button switches which are electrically coupled to the power supply and the microcontroller. Switch S1 is electrically coupled to a first microcontroller input port, and switch S2 is electrically coupled to a second input port a target temperature/humidity is set by activating either switch S1 for decreasing the set point or switch S2 for increasing the set point. Switch S1 and resistor R5 are connected to the DC supply and a microcontroller input port, P33. When switch S1 is open, the DC supply is applied to the microcontroller input. The microcontroller U1 interprets this voltage as a high input and the algorithm does not respond. Closing switch S1 pulls the DC supply to ground causing a low voltage to be applied to the microcontroller input P33. The low voltage is interpreted as a low applied to the microprocessor input. The algorithm responds to the low input by decreasing the set point. Resistor R5 serves as a pull-up resistor to maintain a high value on the input when S1 is not pressed. Switch S2 and resistor R6 operate identically to switch S1 and resistor R5, except that switch S2 and resistor R6 are connected to microcontroller input P32 and activating switch S2 results in an increased set point.

Referring now to the interrupt circuit 9 formed in accordance with the present invention, an interrupt line is coupled to the microcontroller and the AC power line through resistor R1. The interrupt signal is generated by the AC power line at each zero crossing of the 60 Hz sine wave cycle. The counter within the microcontroller is read and then set to zero by the interrupt generated by the zero crossing of the 60 Hz sine wave cycle. A variable clock oscillator 8 increments the counter within the microcontroller U1 during each half cycle. Accordingly, the value in the counter at the next zero crossing of the 60 Hz sine wave cycle indicates how fast the clock oscillator is oscillating. Since the thermistor determines the oscillator frequency, the value in the counter can be related to temperature/humidity by means of a look-up table in the microcontroller algorithm.

The illustrated switching circuit 6 is a high voltage switching circuit which electronically controls the AC power applied to the appliance. The switching circuit 6 receives a signal generated by the microcontroller and responds by applying continuously variable AC power to the appliance. More specifically, the switching circuit 6 is coupled to a microcontroller output port, P27 and the appliance AC power line. Power to the appliance is controlled by triac Q1 for a portion of the cycle of the 60 Hz sine wave cycle. Microcontroller U1 controls the switching circuit by sending a control signal pulse to transistor Q2. Transistor Q2 is coupled to triac Q1 and controls the conducting state of triac Q1, i.e., on or off. Transistor Q2 provides current gain to discharge capacitor C3 into the gate of triac Q1. Triac Q1 responds to transistor Q2 by variably controlling the AC power application to the appliance.

An algorithm in microcontroller U1 varies the duty cycle of the control signal at the output port P27 in relation to sensed temperature/humidity. The output signal provided at output port P27 controls the switching rate of transistor Q2, while resistor R9 limits the base current at transistor Q2. Capacitor C3 is charged to VCC through resistor R4 when transistor Q2 is off a high level pulse on P27 turns on transistor Q2 causing a negative pulse to be applied to the gate of triac Q1. With either polarity of the AC line a negative pulse turns on triac Q1. The point in the AC sinewave where triac Q1 is turned on determines the amount of power applied to the heater/fan. Since the triac Q1 is being turned on when the line voltage is at some value other than zero volts, RFI is generated and must be filtered by capacitor C1 to prevent it from being conducted by the line cord.

The control circuit further includes a display circuit 5. As shown in FIG. 3, display U2 is a multiplexed liquid crystal display which displays the actual ambient temperature/humidity as determined by the control circuit and the desired target temperature humidity. The display is driven by the microcontroller through output ports P20–P26. Control of display U2 is achieved by a voltage divider network comprising of resistors R7, R8, R10, R11 and microcontroller output ports P00–P02. Resistor R7 is coupled to microcontroller port P02, display multiplex input 1, and resistor R10. The second lead of resistor R10 is coupled to microcontroller port P00. Resistor R8 is coupled to microcontroller port P01, display multiplex input 2, and resistor R11.

The variable oscillator circuit 8 formed in accordance with the present invention is also illustrated in FIG. 3. The variable oscillator is electrically coupled to the microcontroller and comprises a thermistor RT1, a capacitor C4, and a variable capacitor C5. The variable oscillator circuit 8 changes frequency in response to ambient temperature changes. These changes are sensed by the thermistor RT1 and are monitored by the microcontroller U1. More specifically, the variable oscillator is connected to the oscillator in (OSC_IN) and the oscillator out (OSC_OUT) pins of the microcontroller. The frequency of the variable oscillator is set by the thermistor RT1 and the capacitor C5. As the ambient temperature changes, the resistance of the thermistor RT1 changes. Thermistor RT1 and capacitor C5 form an R-C timing charge so that as the thermistor RT1 resistance changes, the R-C time constant changes in accordance with temperature. The frequency of the variable oscillator varies in response to the changing R-C time constant which is monitored by the microcontroller. a variable capacitor C4 is provided to compensate for part tolerances. In an alternative embodiment, the thermistor RT1 may be replaced with a humidity sensitive device, such as a variable capacitor, to operate in the same way as described above. There are numerous types of electronic thermostats/humidistats in which the described inventive control circuit of this invention may be used.

Accordingly, an advantage of this type of control circuit is that it does not use the I/O pins of the microprocessor, but rather uses the clock oscillator of the microprocessor which is essential for the microprocessor to function. Yet another distinct feature of the circuit is the use of the 50 or 60 Hz AC line as a precise time reference for measuring the oscillator frequency of the microprocessor.

In operation of a fan for cooling, if the desired target control temperature is below the sensed ambient temperature as determined by the microcontroller by, for example, ten or more units, the controller circuit applies maximum power to the appliance. As the ambient temperature approaches the set point, the sensor responsive device, e.g. thermistor, senses the decrease in temperature and the controller responds by decreasing the power to the fan motor. As the ambient temperature approaches the desired target set point, the controller circuit further decreases the power to the fan motor. This continues until the set point is equal to the sensed ambient temperature, at which point the control circuit terminates power to the fan motor.

In operation of a heater having a heater element, if the desired target set point is above the ambient temperature as determined by the microcontroller to be, for example, ten or more degrees, the controller circuit applies full maximum power to the heater. As the thermistor senses a decrease in the difference between the desired target temperature and the ambient temperature, the control circuit decreases the amount of power applied to the heater element, thereby decreasing heat output. The controller circuit applies continuously less power to the heater until the set control temperature equals the ambient temperature, at which point the control circuit terminates application of power to the heater. Naturally, it will be understood by those skilled in the art that the ten degree temperature threshold may be set to any desired temperature range.

An alternative embodiment may include a humidity sensing device that responds to changes in humidity. Humidifiers generally include either a wick filter and a fan for pulling outside air through the moistened wick filter to redistribute the moistened air into the environment or a heating element in thermal contact with an evaporative water tank for releasing evaporated water into the environment.

In a wick filter device, if the desired target humidity is below the ambient humidity as determined by the microcontroller to be, for example, ten percent or more, the control circuit will apply maximum power to the fan. As the humidity sensor, e.g., a variable capacitive device, senses a decrease in the difference between the desired target humidity and the ambient humidity, the control circuit decreases the amount of power applied to the fan. As the ambient humidity approaches the desired target humidity, the sensor senses the decrease in humidity and the control circuit responds by applying less power to the fan. When the ambient humidity equals the target humidity the control circuit shuts off the power to the fan. The same is true for an evaporative water tank device except power is supplied to a heating element in thermal contact with a water tank to heat and thereby evaporate water into the environment.

The present invention is also directed to a method of controlling appliances such as a fan, a heater, or a humidifier in response to an external source. Such source may be a thermistor or a humidistat which is electrically connected to the variable oscillator of a microprocessor. The method includes controlling the frequency of the variable oscillator by an external source and generating a control signal in response to the changing frequency. The control signal is used to variably adjust power to the appliance.

Additionally, the method may include a means for altering a variable electrical device in response to ambient temperature and/or ambient humidity and controlling the frequency of a clock oscillator in a microprocessor in response to the device. The method includes calculating the ambient temperature and/or ambient humidity in the microprocessor in response to the frequency of the clock oscillator and generating a control signal in response to the calculated ambient temperature and/or ambient humidity. More specifically, a counter in the microprocessor may be set in response to the frequency of the clock oscillator and the value in the counter may be compared to a value in a look-up table to determine ambient temperature and/or ambient humidity. From the calculated ambient temperature/humidity, a control signal may be sent to the appliance to control a number of variables, such as velocity of a fan or power to a motor or heater.

In addition, the variable oscillator is not limited to a variable resistive electrical device. The variable electrical device may include a variably changing capacitor or both a variable capacitive device and variable resistive device.

Provided below is a parts list for each electronic component illustrated in FIG. 3, including a preferred value of resistance, capacitance, and component types. It will be understood by those skilled in the art that similar components with varying values may be used to accomplish the objectives of the invention without departing from the spirit of the invention.

| PARTS LIST FOR THE ELECTRONIC CIRCUIT ILLUSTRATED IN FIG. 3 | | |
|---|---|---|
| Resistor | 3.3M | R1 |
| Resistor | 10K, ½W | R3 |
| Resistor | 1K | R4 |
| Resistor | 100K | R5 |
| Resistor | 100K | R6 |
| Resistor | 100K | R7 |
| Resistor | 100K | R8 |
| Resistor | 1K | R9 |
| Resistor | 100K | R10 |
| Resistor | 100K | R11 |
| Capacitor | 0.001UF | C1 |
| Capacitor | 220UF | C2 |
| Capacitor | 1UF | C3 |
| Variable Capacitor | 4–20PF | C4 |
| Capacitor | 33PF | C5 |
| Diode | 1N4004 | D1 |
| Zener Diode | 4.7V, ½W | D2 |
| Triac | | Q1 |
| Transistor | TO92EBC | Q2 |
| Thermistor | 203JG1Z | RT1 |
| Microcontroller | Z86C04PSC, Z86C08PSC | U1 |
| Display | LCD Dual 7Seg. | U2 |
| Switch | SPST Momentary Push-button | S1 |
| Switch | SPST Momentary Push-button | S2 |
| Fuse | PCB Trace | F1 |

Although illustrative embodiments of the present invention have been described herein with reference to the accompanying drawings, it is to be understood that the invention is not limited to those precise embodiments, and that various other changes and modifications may be effected therein by one skilled in the art without departing from the scope of the invention.

What is claimed is:

1. A controller circuit for use in an appliance to control the appliance output comprising:
   a microprocessor including an algorithm;
   a sensor responsive to ambient temperature and/or humidity, the sensor being electrically connected to the microprocessor for determining ambient temperature and/or humidity; and
   a setting device electrically connected to the microprocessor for setting a desired target temperature and/or humidity value;
   wherein the microprocessor compares the ambient temperature and/or humidity value to the target temperature and/or humidity value and generates a control signal in response thereto for controlling an output of the appliance, the control signal providing a substantially maximum power level to the appliance when the difference between the compared values of ambient temperature and/or humidity and the target temperature and/or humidity is greater than about ten units, and the control signal providing approximately one-half maximum power level to the appliance when the difference between the compared values of ambient temperature and/or humidity and the target temperature and/or humidity is equal to or below about ten units but greater than about one unit and wherein the controller circuit terminates power to the appliance when the difference between the ambient temperature and/or humidity and the target temperature and/or humidity is equal to or less than about one unit.

2. A controller circuit as defined in claim 1, wherein the control signal is provided to one of a fan motor for variably controlling power to a fan and a heater element for variably controlling power to a heater.

3. A controller circuit as defined in claim 1, further including a digital display for displaying either or both the actual sensed ambient temperature and/or humidity and the target temperature and/or humidity.

4. A controller circuit as defined in claim 1, wherein the microprocessor includes a clock oscillator having a frequency associated therewith and wherein the sensor is electrically connected to the microprocessor, the sensor controlling a frequency of the clock oscillator in response to ambient temperature and/or humidity and the microprocessor calculating ambient temperature and/or humidity in response to the frequency of the clock oscillator and generating a control signal in response thereto for controlling an output of the appliance.

5. A controller circuit as defined in claim 4, wherein the microprocessor further includes a counter, a counter value being responsive to the clock oscillator for determining the frequency thereof.

6. A controller circuit as defined in claim 5, wherein the microprocessor further includes a look-up table for calculating ambient temperature and/or humidity in response to the counter value.

7. A controller circuit as defined in claim 5, wherein the microprocessor includes an interrupt and the counter value is set to zero by a zero crossing of the interrupt, the counter value at a subsequent zero crossing providing a basis for determining the clock oscillator frequency.

8. A thermostatic control circuit for a portable heater comprising:
a microcontroller including a clock oscillator having an input and an output and having a frequency associated therewith;
a means for setting a target temperature; and
a thermistor for sensing an ambient temperature, the thermistor being connected across the clock oscillator input and output for controlling the frequency of the clock oscillator in response to the sensed ambient temperature, the microcontroller generating one of a plurality of discrete control signals in response to the clock oscillator frequency, each control signal corresponding to a different power level to be applied to a heater circuit.

9. A controller circuit as defined in claim 8, wherein the microcontroller includes a counter, a counter value being responsive to the clock oscillator for determining the frequency thereof.

10. A controller circuit as defined in claim 9, wherein the microcontroller further includes a look-up table for calculating ambient temperature in response to the counter value and outputting a control signal based upon a comparison of the calculated ambient temperature and the target temperature.

11. A controller circuit as defined in claim 10, wherein the microcontroller includes an interrupt and the counter value is set to zero by a zero crossing of the interrupt, the counter value at a subsequent zero crossing providing a basis for determining the clock oscillator frequency.

12. A controller circuit as defined in claim 8, wherein the control signal is provided to one of a fan motor for variably controlling motor speed of the fan and a heater element.

13. An appliance including a controller for varying an output of the appliance comprising:
means for sensing and calculating an ambient condition;
means to set a target ambient condition;
a controller circuit electrically coupled to the sensing and calculating means and set means, said controller circuit including means for comparing the sensed ambient condition and the target ambient condition; and
appliance output means for altering an ambient condition to attain the target ambient condition, wherein in response to the compared sensed ambient condition and the target ambient condition, said controller circuit controls the output means to operate at a maximum level when the sensed and target ambient conditions are at least about ten units different, the controller circuit controls the output means to operate at a one-half maximum level when the difference between the sensed and target ambient conditions is equal to or below about ten units but greater than about one unit, and the controller circuit stops the output means when the difference between the sensed and target ambient conditions is equal to or less than one unit.

14. An appliance as defined in claim 13, wherein the appliance is a heater, the sensing means senses ambient temperature and the output means is a heater element.

15. An appliance as defined in claim 13, wherein the appliance is a fan, the sensing means senses ambient temperature and the output means is a fan motor.

16. An appliance as defined in claim 13, wherein the appliance is a humidifier, the sensing means senses relative humidity and the output means is a heating element to create output humidity.

17. An appliance as defined in claim 13, wherein the appliance is a humidifier, the sensing means senses relative humidity and the output means is a fan to create airflow through an evaporative wick element.

18. A method of thermostatically controlling a portable heater using a microcontroller, the microcontroller including a clock oscillator, a means for setting a target ambient temperature, and a thermistor responsive to sensed ambient temperature, the thermistor being electrically connected to the clock oscillator, comprising the steps of:
setting a target ambient temperature;
controlling a frequency of oscillation of the clock oscillator in response to the sensed ambient temperature changing the resistance of the thermistor thereby changing a frequency of oscillation of the microcontroller; and
generating via the microcontroller one of a plurality of discrete control signals in response to the frequency of the clock oscillator, each control signal corresponding to a different power level to be applied to a heater circuit of the portable heater.

19. A method as defined in claim 18, wherein the method further includes the steps of:
　setting a value in a counter in the microcontroller in response to the frequency of the clock oscillator; and
　comparing the value in the counter to a look-up table in the microcontroller to determine ambient temperature.

20. A method of generating one of a plurality of discrete thermostatic control signals for operating a heater, each thermostatic control signal corresponding to a different power level to be applied to an appliance comprising the steps of:
　setting a target temperatures;
　altering a resistance of a thermistor in response to ambient temperature, the thermistor being electrically coupled to an input of a clock oscillator of a microcontroller;
　controlling a frequency of the clock oscillator in the microcontroller in response to a value of the thermistor;
　calculating ambient temperature in the microcontroller in response to the frequency of the clock oscillator; and
　comparing the target temperature to the calculated ambient temperature and generating one of a plurality of discrete control signals in response to the compared target temperature and calculated ambient temperature, each control signal corresponding to a different power level to be applied to the heater depending upon the difference between the target temperature and the calculated ambient temperature.

21. A method as defined in claim 20, wherein the altering step includes variably changing one of resistance and capacitance of the electrical device.

22. A method as defined in claim 20, wherein the altering step includes variably changing resistance and capacitance of the electrical device.

23. A method as defined in claim 22, further including the step of setting a value in a counter of the microcontroller in response to the frequency of the clock oscillator and wherein the step of calculating includes comparing the value of the counter to a look-up table in the microcontroller to determine one of ambient temperature and ambient humidity.

* * * * *